(12) United States Patent
Davies et al.

(10) Patent No.: US 9,813,261 B2
(45) Date of Patent: Nov. 7, 2017

(54) CONTEXT-BASED MESSAGING SYSTEM

(75) Inventors: Stephen A. Davies, Mulhuddart (IE);
Daniel J. McCloskey, Mulhuddart (IE);
Simon P. O'Doherty, Mulhuddart (IE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1269 days.

(21) Appl. No.: 13/593,898

(22) Filed: Aug. 24, 2012

(65) Prior Publication Data

US 2013/0054718 A1    Feb. 28, 2013

(30) Foreign Application Priority Data

Aug. 24, 2011    (EP) .................................... 11178669

(51) Int. Cl.
*G06F 15/16* (2006.01)
*H04L 12/64* (2006.01)

(52) U.S. Cl.
CPC ................................ *H04L 12/6418* (2013.01)

(58) Field of Classification Search
CPC .... G06F 17/30731; H04L 51/32; H04L 51/24
USPC .................................................. 709/204, 206
See application file for complete search history.

(56) References Cited

U.S. PATENT DOCUMENTS

| 7,307,509 | B2 | 12/2007 | Chriss |
| 7,487,441 | B2 | 2/2009 | Szeto |
| 7,503,007 | B2 | 3/2009 | Goodman et al. |
| 7,814,152 | B2 | 10/2010 | McGowan et al. |
| 7,913,176 | B1 | 3/2011 | Blattner et al. |
| 8,751,538 | B1* | 6/2014 | Wheeler et al. ............... 707/791 |
| 2003/0156134 | A1 | 8/2003 | Kim |
| 2005/0198175 | A1* | 9/2005 | Thomas ................ H04L 12/583 709/206 |
| 2007/0067398 | A1 | 3/2007 | Karmarkar |
| 2009/0031232 | A1 | 1/2009 | Brezina et al. |
| 2009/0157614 | A1* | 6/2009 | Smith et al. ...................... 707/3 |
| 2009/0171937 | A1 | 7/2009 | Chen et al. |

(Continued)

FOREIGN PATENT DOCUMENTS

| EP | 2482532 A1 | 8/2012 |
| WO | 2010120559 A2 | 10/2010 |
| WO | 2011078975 A1 | 7/2011 |

OTHER PUBLICATIONS

Tuset, P et al., "Messenger Visual: A pictogram-based IM service to improve communications among disabled people"., Oct. 16-20, 2010., [Whole Document]., website="http://delivery.acm.org/10.1145/1870000/1869032/p797-tuset.pdf?ip=151.207.250.71&id=1869032&acc=ACTIVE%20SERVICE&key=C15944E53D0ACA63%2E4D4702B0C3E38B35%2E4D4702B0C3E38B35%2E4D47( (Continued)

*Primary Examiner* — Wing F Chan
*Assistant Examiner* — Andrew Woo
(74) *Attorney, Agent, or Firm* — Cuenot, Forsythe & Kim, LLC

(57) ABSTRACT

Socially provided context-based messaging can include receiving a message content in a messaging system from a user, wherein the content includes objects; matching one or more objects of the message content to socially provided context information, which the socially provided context information is information relevant to an object obtained from a social network to which the user belongs; and displaying the socially provided context information with the message content for a recipient user to receive.

20 Claims, 3 Drawing Sheets

(56) References Cited

U.S. PATENT DOCUMENTS

| | | | |
|---|---|---|---|
| 2009/0215479 A1 | 8/2009 | Karmarkar | |
| 2009/0645481 | 12/2009 | Novikov et al. | |
| 2009/0645482 | 12/2009 | Novikov et al. | |
| 2009/0645484 | 12/2009 | Novikov et al. | |
| 2010/0159883 A1 | 6/2010 | Pascal et al. | |
| 2010/0255865 A1 | 10/2010 | Karmarkar | |
| 2011/0112912 A1* | 5/2011 | Wu | G06Q 10/10 705/14.73 |
| 2011/0173071 A1 | 7/2011 | Meyer et al. | |
| 2011/0183732 A1 | 7/2011 | Block et al. | |
| 2012/0054284 A1* | 3/2012 | Rakshit | 709/206 |
| 2012/0137254 A1* | 5/2012 | Cunningham et al. | 715/835 |
| 2013/0054718 A1* | 2/2013 | Davies et al. | 709/206 |

OTHER PUBLICATIONS

Great Britain Patent Application GB1207169.2, Combined Search and Examination Report under Section 17 and 18(3), Aug. 24, 2012, 9 pgs.

Gonzales, C.H. et al., "Augmentative and Alternative Communication Technologies," [online] Computer Engineering, Concepts, Methodologies, Tools and Applications, Dec. 2011, retrieved from the Internet: <http://web.cgu.edu/faculty/leroy/content/Papers/2009-Heins-Gonzales-eHealth-chapter.pdf>, 16 pgs.

* cited by examiner

CONTEXT-BASED MESSAGING SYSTEM

CROSS REFERENCE TO RELATED APPLICATIONS

This application claims the benefit of priority from European Patent Application 11178669.5, filed on Aug. 24, 2011, which is fully incorporated herein by reference.

BACKGROUND

The background and description are provided in the environment of messaging systems used for augmentative and alternative communication (AAC) for communication for those with impairments or restrictions on the production or comprehension of spoken or written language.

There are a number of different known systems to help users with different impairments including picture-based systems in relation to instant messaging or other messaging systems where the other user may use normal communication methods (typing/talking) or may also use AAC. There are existing AAC instant messaging applications in which a picture board is supplied adjacent to the chat window and the user generates text messages by clicking the pictures. The received text may be spoken to the end user.

While this works for high functioning AAC users, it is limited when it comes to users who may have pragmatic language impairments (e.g., Autism, Asperger's Syndrome, etc.). Often the context of a phrase may be lost or the user may misinterpret the words. An AAC picture board may not pick up on the user's idiosyncrasies.

Confusion may also happen if the other user is an AAC user as well. Selecting certain phrases on the AAC may have different contexts for different users.

Although AAC pictures may come with textual context, without this context pictures may be interpreted as having overlapping or similar meanings. In some cases, users of the AAC board may interpret contexts beyond the scope of recognized meanings leading to further confusion to those they may communicate with.

BRIEF SUMMARY

According to a first aspect of the present invention there is provided a method for socially provided context-based messaging, comprising: receiving a message content in a messaging system from a user, wherein the content includes objects; matching one or more objects of the message content to socially provided context information, wherein the socially provided context information is information relevant to an object obtained from a social network to which the user belongs; and displaying the socially provided context information with the message content for a recipient user to receive.

According to a second aspect of the present invention there is provided a system for socially provided context-based messaging, comprising: a data processing system configured to execute a messaging client application at which a message content is received from a user, wherein the content includes objects; a matching system provided in a messaging system for matching one or more objects of the message content to socially provided context information, wherein the socially provided context information is information relevant to an object obtained from a social network to which the user belongs; and a receiving data processing system configured to execute a messaging client application displaying the socially provided context information with the message content for a recipient user to receive.

According to a third aspect of the present invention there is provided a computer program product for socially provided context-based messaging. The computer program product includes a computer-readable storage medium having stored thereon program code that, when executed, configures a processor to perform executable operations. The executable operations include receiving a message content in a messaging system from a user, wherein the content includes objects; matching one or more objects of the message content to socially provided context information, wherein the socially provided context information is information relevant to an object obtained from a social network to which the user belongs; and displaying the socially provided context information with the message content for a recipient user to receive.

According to a fourth aspect of the present invention there is provided a system. The system includes a processor configured to initiate executable operations. The executable operations include receiving a message content in a messaging system from a user, wherein the content includes objects; matching one or more objects of the message content to socially provided context information, wherein the socially provided context information is information relevant to an object obtained from a social network to which the user belongs; and displaying the socially provided context information with the message content for a recipient user to receive.

BRIEF DESCRIPTION OF THE SEVERAL VIEWS OF THE DRAWINGS

Embodiments of the invention will now be described, by way of example only, with reference to the accompanying drawings in which.

Figure 1:
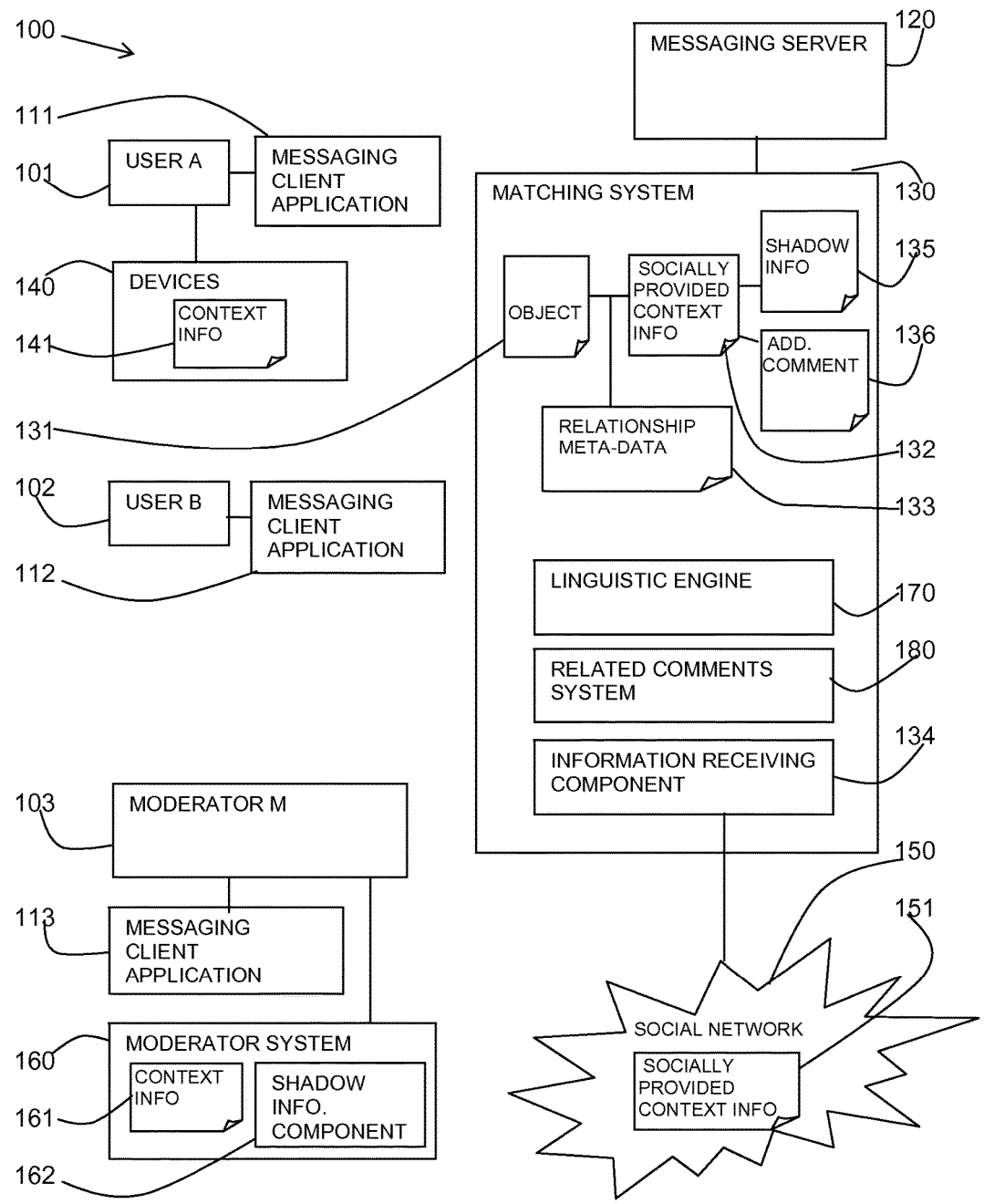
FIG. 1 is a block diagram of an example embodiment of a system in accordance with a preferred embodiment of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

DETAILED DESCRIPTION

In the following detailed description, numerous specific details are set forth in order to provide a thorough understanding of embodiments of the invention. However, it will be understood by those skilled in the art that the embodiments of the present invention may be practiced without these specific details. In other instances, well-known methods, procedures, and components have not been described in detail so as not to obscure the embodiments of the present invention.

One or more embodiments of the invention relate to the field of messaging systems. In particular, one or more embodiments of the invention relate to socially provided context-based messaging systems. The described method and system provide messaging which provides relevant socially-provided context information to either or both of the messaging participants using the content of a message input matched to socially-provided context information from a social network of the participant.

In the environment of AAC, the described method and system may provide context awareness in relation to the social environment to create a more relevant set of images or other forms of information that would be understood by the AAC user. Existing AAC messaging systems may be improved by taking a larger set of socially provided context information into account when determining additional information to display. In AAC systems, the social context may be moderated by a responsible third party such as a care giver, therapist, or other moderator or administrator. However, the described method and system may also be applied to non-AAC applications to provide relevant socially provided context information, as described further below.

In the non-AAC environment, analysis of the social context (e.g. Web2.0) of one or both of the participants may be used to provide additional relevant social context information in the form of images or other information. A non-AAC environment may use standard instant messaging or social networks (for example, Facebook (Facebook is a trade mark of Facebook, Inc.), Google+ (Google+ is a trade mark of Google Inc.)). The system may look for social contacts between the two people to help in defining a context (for example, "Bus stop" might refer to a day out that one user would not recognize but another would).

The social context information may be provided in addition to the original message content to provide more insight into the message context for the receiving participant. The form of messaging system to which the described method and system may be applied includes instant messaging, email, web chat rooms or forums, short message service (SMS), and also messaging system using speech.

Semantic analysis of social context may be provided in order to provide additional relevant information in messaging systems. Cognitive connections between the speaker and listener may be used. The system may determine the correct images or other information to display to both end users (as part of a textual assist if needed). This can be used in overlay of spoken language or through typed medium.

The system may use a combination of pictures, chat/voice and web cam/stored images on mobile device as needed to determine the social context. The system also allows the user's social network to build trust contexts with common images, to help others.

Referring to FIG. 1, a block diagram shows an example of the described system 100. The system 100 may include three different types of participants. A first type of participant may be the first user A 101 who uses the described functionality of providing relevant social context information based on a message input. In one embodiment, the first user A 101 may have communication impairments and may use AAC. A second type of participant may be a second user B 102, who may or may not need to use AAC, in communication with the first user A 101. A third type of participant may be a moderator M 103 of the first user A 101.

In the case in which the first user A 101 has communication impairments and uses AAC, the moderator M 103 may be a language therapist, a general practitioner, a caregiver, a social worker, etc. In the case in which the first user A 101 does not have communication impairments and does not use AAC, the moderator M 103 may be an administrator or the first user A 101 may moderate himself.

The first user A 101 and the second user B 102 and, optionally, the moderator M 103, may have messaging client applications 111, 112, 113 which include graphical user interfaces (GUI) which may have additional functionality added for displaying relevant social context information for a message input.

The system 100 may include a messaging server 120 which supports the additional functionality of providing relevant social context information for a message input and may include or have access to a matching system 130. The matching system 130 may provide a mapping between objects 131 of a message input which may be in the form of words, phrases, images, etc. and context information 132 which may be in the form of images, data, text, etc. The matching system 130 may provide relationship meta-data 133 between objects 131 and context information 132.

Participant context information 141 may be stored and collected from databases or devices 140 of the user A 101. For example, such databases or devices may include personal data, images, etc.

A social network 150 may be provided of contributors of social context information 151 for user A 101. The social network 150 may be an existing social network to which user A 101 belongs. The social network 150 may have different settings allowing different levels of contribution by contributors, for example, with the user A 101 or, in the case of a user A 101 requiring AAC, a moderator M 103 having the highest access. A plugin engine may be provided to interface with a social network 150 to act as a bridge between the required functionality of the described system of obtaining context information 151 and with social network APIs (for example, OpenSocial API (OpenSocial is a trade mark of Google Inc.) or Facebook API).

The moderator M 103 is particularly applicable in the embodiment in which user A 101 requires AAC. The moderator M 103 can oversee the social context information on behalf of user A 101. The moderator M 103 may have a moderator system 160 for provision of additional context information 161 for a user. The moderator system 160 may include a shadow information component 162.

The matching system 130 may include an information receiving component 134 for receiving context information 141 from the participant databases and devices 140, social context information 151 from the social network 150, and/or moderator's context information from a moderator's external site 160. The various forms of context information 141, 151, 161 may be stored as context information 132 matched to an object 131 with relationship meta-data 133.

A linguistic engine 170 may be provided at a messaging client 111, messaging server 120, or matching engine 130, for breaking down a text or audio input and recognizing objects 131 within the message input for matching to context information 132.

The matching system 130 may also include a searching component 190 for searching the related objects 131 and context information 132. A filter component 191 may be provided for filtering the relationship meta-data 133.

A moderator M 103 may provide shadow information 135 which is context information which the moderator M 103 determines is more appropriate to an object 131 than given context information 132. For example, in the embodiment of a user A 101 who requires AAC, the moderator M 103 may try to reinforce more appropriate context information relating to an object 131 instead of the context information 132 currently associated with the object 131.

The matching system 130 may include additional comments 136 associated with context information 132. A related comments system 180 may be provided, as part of the matching system 130 or accessible by the matching system 130, allowing contributors or participants in messaging with a user A 101 to view the additional comments 136 on the context information 132 provided corresponding to an object 131. The related comments system 180 relates to optional features presented to participants given they have the correct permissions to view/edit. Example features include:

Read a comment.

Edit a comment.

Vote on a comment attached to an image.

Moderate comments (approve/delete/edit).

A list of related people in the social network of user A with the option to contact them. If this is used then the person contacted may get a breakdown of related images/conversations they are being contacted with regard to (this can be configured).

See a list of other common images that may have a better context to that image.

See a paired image that user A will see but which is not correct.

If the image is a shadow image, and if so at what level should it be visible.

Figure 2:
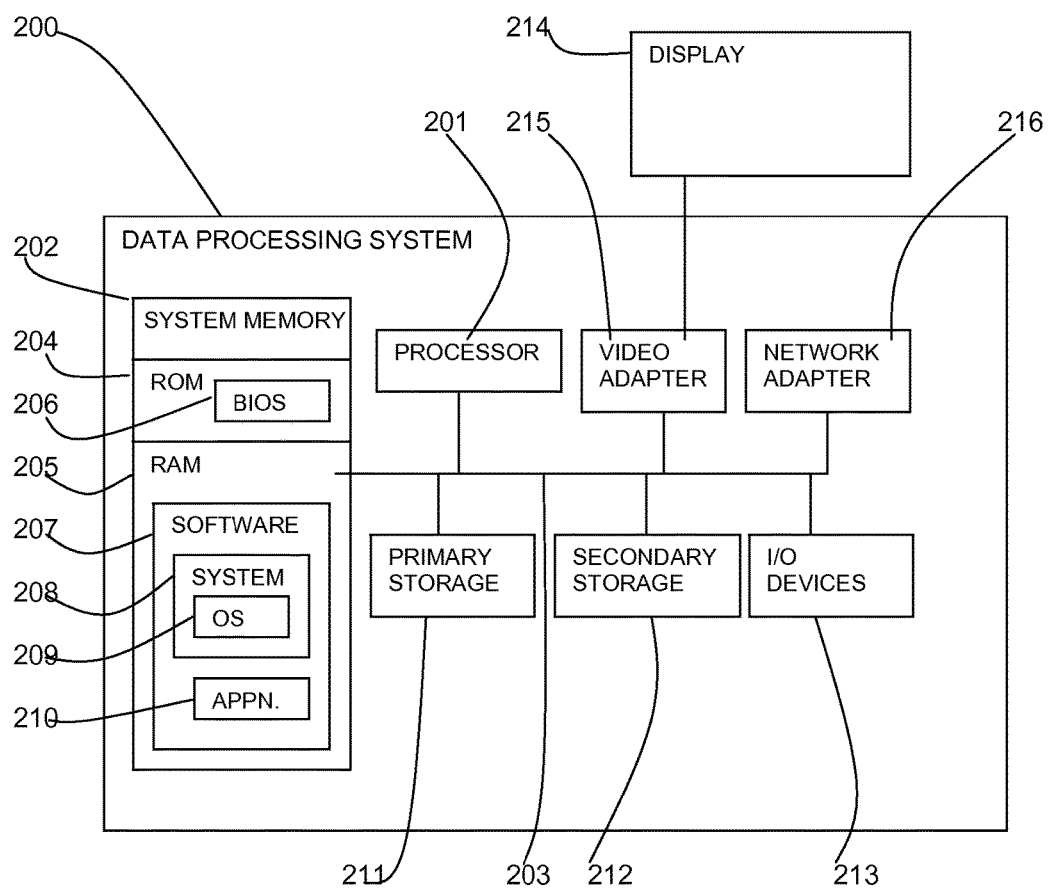
FIG. 2 is a block diagram of a computer system in which a preferred embodiment of the present invention may be implemented.

Referring to FIG. 2, an exemplary system for implementing aspects of the invention includes a data processing system 200 suitable for storing and/or executing program code including at least one processor 201 coupled directly or indirectly to memory elements through a bus system 203. The memory elements can include local memory employed during actual execution of the program code, bulk storage, and cache memories which provide temporary storage of at least some program code in order to reduce the number of times code must be retrieved from bulk storage during execution.

The memory elements may include system memory 202 in the form of read only memory (ROM) 204 and random access memory (RAM) 205. A basic input/output system (BIOS) 206 may be stored in ROM 204. System software 207 may be stored in RAM 205 including operating system software 208. Software applications 210 may also be stored in RAM 205.

The system 200 may also include a primary storage means 211 such as a magnetic hard disk drive and secondary storage means 212 such as a magnetic disc drive and an optical disc drive. The drives and their associated computer-readable media provide non-volatile storage of computer-executable instructions, data structures, program modules and other data for the system 200. Software applications may be stored on the primary and secondary storage means 211, 212 as well as the system memory 202.

The computing system 200 may operate in a networked environment using logical connections to one or more remote computers via a network adapter 216.

Input/output devices 213 can be coupled to the system either directly or through intervening I/O controllers. A user may enter commands and information into the system 200 through input devices such as a keyboard, pointing device, or other input devices (for example, microphone, joy stick, game pad, satellite dish, scanner, or the like). Output devices may include speakers, printers, etc. A display device 214 is also connected to system bus 203 via an interface, such as video adapter 215.

Figure 3:
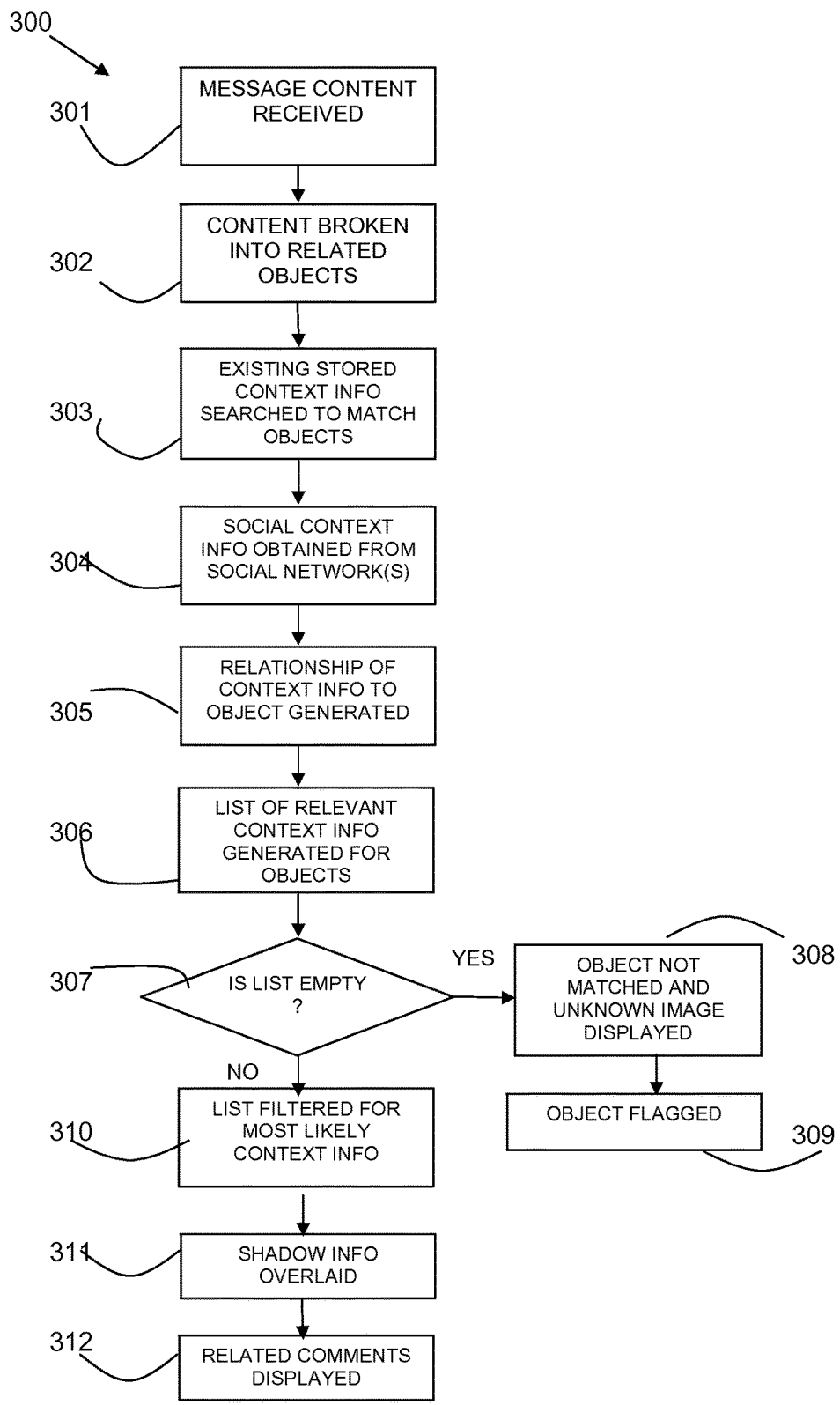
FIG. 3 is a flow diagram of an example embodiment of a method in accordance with a preferred embodiment of the present invention.

Referring to FIG. 3, a flow diagram shows an embodiment of the method 300 carried out by the matching system. A message content as input by a user is received 301 in the messaging system. The content may be broken down 302 by a linguistic engine into its related objects. The related objects may be words, phrases, numbers, of the content as well as images, attachments, etc.

Existing stored context information may be searched 303 to match the objects. Social context information may be obtained 304 from one or more social networks of the participant providing the message input. Other additional context information may be obtained by being pulled from a user's database of images/devices, and/or may be obtained from an external site provided by a moderator.

The relationship of the context information to an object may be generated 305 with meta-data, for example, including the following:

Text comment of image.

Social comment (ranked on votes).

Relationship of entity to the person being conversed with.

Global Positioning System (GPS) data.

Image recognition. E.g. Face detection.

Other Exchangeable Image File Format (EXIF) information of image.

Moderator flagged images for that object.

Relationship of entity to another entity within the sentence. E.g. "[Ann]" can mean Mother or cousin depending on context.

Date/Time relationship. E.g. "[ZOO] [LAST SATURDAY]" vs. "[ZOO] [LAST YEAR]".

Images flagged by the moderator.

Stored audio on device. Example would be a picture taken and audio at that time flagging to match to the entity through voice/sound recognition.

A list of relevant context information (for example, images and data) may be generated 306 against the objects of the message content input.

It may be determined 307 if the list is empty. If so, an object is not matched and an "Unknown" image may be displayed 308 (for example, "?"). The person who input the text with the object may be flagged 309 to correct the missing information. The object may also be flagged for the attention of a moderator. Optionally, the user may be passed to an external site to find matching context information, such as an image.

If the list is not empty, each of the context information elements within the generated list may be checked for any shadow information or related comments information. For example, shadow information may be provided where a participant is using the incorrect image and a moderator has selected another to take its place. Related comments information may be provided via a social network to provide insight into the context information.

The list may then be filtered to display 310 the most likely context information. The precedence of meta-data may be configured by a user or moderator to set the relevance of meta-data entries.

In the event of an element of context information having shadow information, then based on the data, the shadow information may be overlaid 311 to slowly force a user to accept the correct information. Examples of methods of overlays can be opacity, grouped together, or appear on mouse over.

In the event of an element of context information having related comments information, and the receiving participant having the authorization to view the comments, these comments may also be displayed 312.

In one embodiment of a messaging system in the form of an AAC enabled instant messaging system, the system may be initially configured with the following settings.

1. A standard picture cards layout for an instant messaging window with picture cards corresponding to or mapped to text input such as words or phrases.

2. Pre-defined images for the user. (For example, common items that the user uses.)

3. Security settings for social network users. Sample settings include:
   Read/Write comments to existing pictures.
   Moderate comments.
   Vote on comments (agree/disagree).
   Allow others to contact those within the social network.
   Ability to generate reports.

4. The user devices may be queried either live or via sync results. Some examples of devices may include:
   A personal digital assistant (PDA)/AAC device.
   Internet sites. (for example, social network sites, image hosting services, etc.).
   Machines/Shared drives in relation to a social network.

The following are example conversational workflows in an instant messaging system with a user A who requires AAC and in which the context information is provided in the form of images.
   Actors:
   User (A)—User of the system. Person is language impaired.
   User (B)—Normal user. Does not have the system installed.
   User (C)—Another user of the system. Person may or may not be language impaired.
   User (M)—Moderator (e.g. LT/GP/caregiver/social worker)

(B)->(A) Interaction.

1. User opens an instant message window. The user is warned that the person they are communicating with is using the system. It may ask them to install the related system, or refer them to an interface via another system (e.g. Web site).

2. (B) writes in their message to (A).

3. The system takes the message and attempts to break it down into related sentence objects (e.g. Subject, Object, Verb). This is done by linguistic analysis.

4. Each object is mapped to a related image in the system.

5. The image is displayed to (A).

6. Optionally, the image can also be displayed to (B) with mouse over text which gives details as to the sentence object and other notes as to why it was picked.

7. Also optionally, the system may URL hot link the image to point to a connection to the system to give more in depth details.

(A)->(B) Interaction.

1. (A) opens a chat window to (B) or is responding to existing message.

2. (A) may select from a standard picture board or type text. Within the picture board is the picture tree to allow them to map to particular devices. If they are typing text, then related images may pop up in the system for them to quickly select from if needed.

3. Once the message is complete, the images are sent to (B) to read. (B) may also receive a text based description of the pictures.

4. Depending on settings (B) may be able to see text on mouse over or URL links to better details (as per B->A interaction).

(C)->(A) Interaction.

1. The user opens a chat window or is responding to an incoming message.

2. As the user types, the related sentence object may be highlighted and related images may be shown.

3. The user can click on a related image that best describes what it is they are trying to say. When they do this, IF they have the rights they may see related comments by others.

4. With text selected against an image, the user can if they have the rights to do so, map that image to their text, as well as add additional comments to the image. This may be tagged with the author of the comments, date and time. There may also be a voting option for confidence of the related image.

5. Where no match is found at all, then a generic "Don't know" image may be used. Alternatively they may opt to call someone within (A)'s social network to get a better image.

6. The user sends the message to (A).

7. Optionally, where language breaks down (C) may flag the lines/conversation for review by a moderator.

(M) Interaction.

The moderator may get a breakdown of common images used, their context and interaction with users. They can apply rights to other users, and modify full settings of the system. The moderator system may be fully tiered for different users. As the system priority is the language of (A), modifying images within (A)'s picture board tree or context may be set to a highest security setting. The moderator may also be able to see overlaid (shadowed) images (from C->interaction).

The following is an example of a scenario of an AAC user conversation.
   Conversation:
   Person B: "Did you enjoy the Zoo last Saturday?"
   Person A: "Soda"

In this case it appears meaningless unless Person B is familiar with the context of the word "Soda".

This response does not make much sense. Does Person A want a drink? Did something happen in relation to the zoo+soda? Is Person A actually in the conversation?

With the described system, the context of the words/pictures may be mapped to existing incidents recorded in the system. This may be through other conversations, what is pre-programmed or associated with stored recordings (e.g. GPS to image mapped data), as well as social based descriptive comments.

So in the example above, the following context is provided:
   Person B
   [Zoo] [Saturday]—Application scans the EXIF image information that maps to that date and GPS information which would flag a relationship with Saturday and a Zoo recently.
   [Fun]—Looks for images which may be flagged as positive key good events.

Person B is given a list of images from which to select to get their context understood. The response is more positive now.

Going back to the initial response of "Soda", the system refers back to common instances of "Soda" used previously in the system. It also checks for comments attached to the word which others users have added to explain the context. In this case it may come back with:
   "I don't understand"*
   "Confusion"
   "Accident"
   "Drink"
   "Thirsty"

*With a tagged comment of: "Spilt soda when younger because he got confused on what I asked. Equates the word "soda" with confusion or not understanding"—Anne (Mother) Jan. 5, 2011.

This comment may further be voted up/down by others within the social network to help reinforce known contexts. The explanations may also be locked down to known instant message contacts. Users within the social network may also opt to have conversations tagged to troublesome words to help others guess what may be described.

In other instances the system may translate for the person at the other end. So if they were to say "I don't understand" the correct context is shown to Person A but is also shown the "Soda" image to help link the response. This can slowly fade out the "Soda" image until it is no longer visible once the correct term is determined to attempt to avoid incorrect reinforcers.

The data collected may also be reviewed at a later point reviewed by a Language Therapist (LT)/GP/caregiver/social worker to help improve the user's quality of life.

The embodiments of the invention can take the form of an entirely hardware embodiment or an embodiment containing both hardware and software elements. In a preferred embodiment, the invention is implemented in software within suitable hardware, which includes but is not limited to firmware, resident software, microcode, etc.

The invention can take the form of a computer program product accessible from a computer-usable or computer-readable medium providing program code for use by or in connection with a computer or any instruction execution system. For the purposes of this description, a computer usable or computer readable medium can be any apparatus that can contain, store, communicate, propagate, or transport the program for use by or in connection with the instruction execution system, apparatus or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read only memory (ROM), a rigid magnetic disk and an optical disk. Current examples of optical disks include compact disk read only memory (CD-ROM), compact disk read/write (CD-R/W), and DVD.

Improvements and modifications can be made to the foregoing without departing from the scope of the present invention.

What is claimed is:

1. A method for socially provided context-based messaging, comprising:
   receiving, in a messaging system and from a user, message content including a plurality of objects;
   matching an object of the plurality of objects to socially provided context information;
   moderating the socially provided context information by overlaying shadow information which a moderator considers more appropriate than the matched socially provided context information; and
   displaying the moderated socially provided context information with the message content, wherein
   the socially provided context information is information relevant to the object and obtained from a social network to which the user belongs.

2. The method as claimed in claim 1, wherein
the socially provided context information is provided by a member of the social network.

3. The method as claimed in claim 1, wherein
relationship meta-data is provided that links the object and the socially provided context information.

4. The method as claimed in claim 3, wherein
the relationship meta-data is filtered during the matching the object to the socially provided context information.

5. The method as claimed in claim 1, wherein
additional context information is matched to the object, and
the additional context information is obtained from a device of the user.

6. The method as claimed in claim 1, wherein
the socially provided context information is stored in relation to the object.

7. The method as claimed in claim 1, wherein
additional relevant comments relating to the socially provided context information are provided.

8. The method as claimed in claim 1, wherein
the messaging system is provided for the user using augmentative and alternative communication (AAC).

9. The method as claimed in claim 1, wherein
the object is identified by linguistic analysis on the message content.

10. A computer program product for socially provided context-based messaging, comprising:
    a hardware storage device having stored thereon program code that, when executed, configures a processor to perform:
      receiving, in a messaging system and from a user, message content including a plurality of objects;
      matching an object of the plurality of objects to socially provided context information;
      moderating the socially provided context information by overlaying shadow information which a moderator considers more appropriate than the matched socially provided context information; and
      displaying the moderated socially provided context information with the message content, wherein
    the socially provided context information is information relevant to the object and obtained from a social network to which the user belongs.

11. The computer program product as claimed in claim 10, wherein
the socially provided context information is provided by a member of the social network.

12. The computer program product as claimed in claim 10, wherein
relationship meta-data is provided that links the object and the socially provided context information.

13. A computer hardware system comprising:
    a memory;
    a hardware processor;
    the hardware processor coupled to the memory configured to initiate the following executable operations:
      receiving, in a messaging system and from a user, message content including a plurality of objects;
      matching an object of the plurality of objects to socially provided context information;
      moderating the socially provided context information by overlaying shadow information which a moderator considers more appropriate than the matched socially provided context information; and
      displaying the moderated socially provided context information with the message content, wherein
    the socially provided context information is information relevant to the object and obtained from a social network to which the user belongs.

14. The system of claim 13, wherein
the socially provided context information is provided by a member of the social network.

15. The system of claim 13, wherein
relationship meta-data is provided that links the object and the socially provided context information, and
the relationship meta-data is filtered during the matching the object to the socially provided context information.

16. The system of claim 13, wherein
additional context information is matched to the object, and
the additional context information is obtained from a device of the user.

17. The system of claim 13, wherein
the messaging system is provided for the user using augmentative and alternative communication (AAC).

18. The system of claim 13, wherein
the object is identified by linguistic analysis on the message content.

19. The system of claim 13, wherein
the socially provided context information is stored in relation to the object.

20. The system of claim 13, wherein
additional relevant comments relating to the socially provided context information are provided.

* * * * *